Patented July 29, 1952

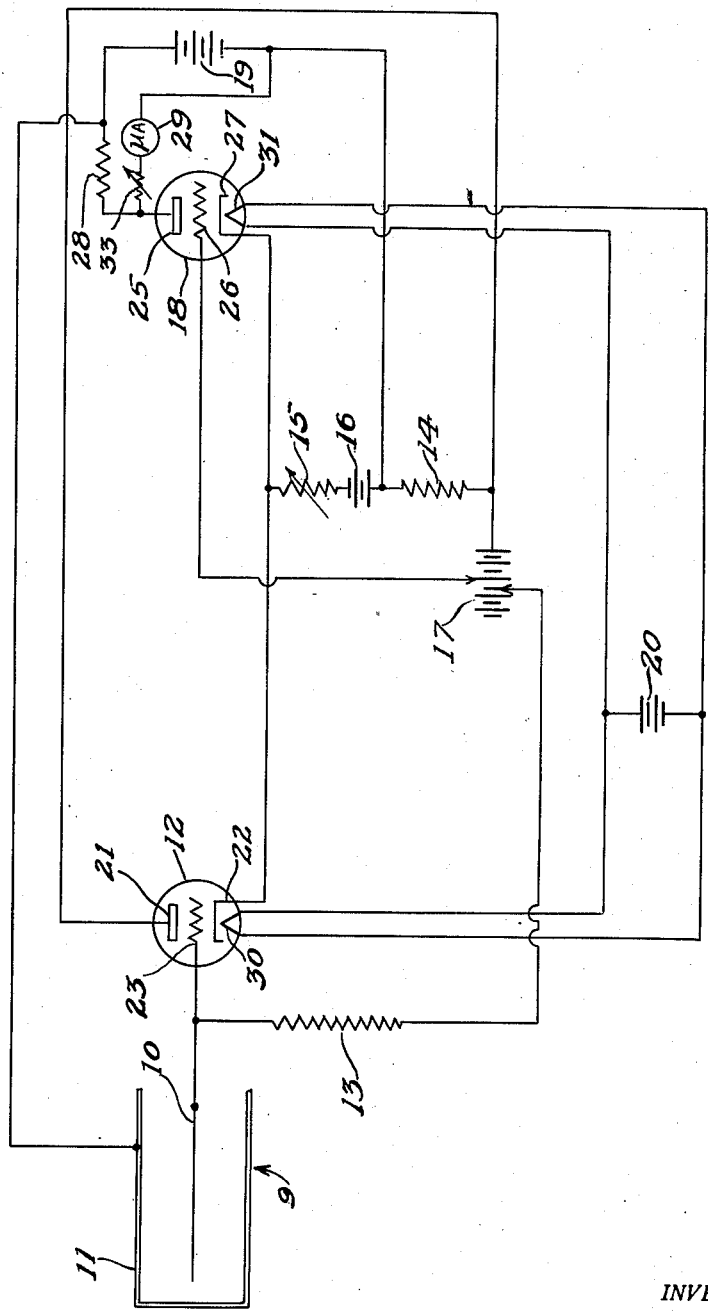

2,605,429

UNITED STATES PATENT OFFICE 2,605,429

PORTABLE RADIATION SURVEY INSTRUMENT

Howard V. Herndon and Rodney G. Hoff, Richland, Wash., assignors to the United States of America as represented by the United States Atomic Energy Commission Application September 11, 1950, Serial No. 184,304

7 Claims. (Cl. 250—83.6)

The present invention relates to radiation measuring devices utilizing ionization chambers, and more specifically to improvements upon such radiation measuring devices to reduce the response time of the device.

One approach to the problem of reducing the response time of a radiation measuring device utilizing an ionization chamber is disclosed in Patent No. 2,465,938, issued to Francis R. Shonka, entitled "Radiation Measuring Device." The device disclosed in this patent, however, is only broadly relevant to the present invention and has certain disadvantages overcome by the present invention.

For a better understanding of the invention, reference is made to the single figure of the drawing, which is a schematic electrical circuit diagram of a radiation measuring device.

The device consists of an ionization chamber circuit, and a direct current amplifier and measuring circuit which are interconnected in a novel manner. The ionization chamber circuit consists of an ionization chamber 9 connected in series with a portion of battery 17, battery 19, resistor 14 and ionization resistor 13. The direct current amplifier and measuring circuit consists of a two-stage direct current amplifier including a microammeter 29 in the output circuit of the second stage which is calibrated directly in terms of radiation intensity.

The first stage of the electronic measuring circuit consists of a vacuum tube 12 having a grid-to-cathode input circuit and a plate-to-cathode output circuit. The control grid 23 of the vacuum tube 12 is connected to the center electrode 10 of the ionization chamber 9. The input circuit consists of the ionization resistor 13, a portion of battery 17, resistor 14, battery 16 and variable resistor 15, all connected in series between the control grid 23 and the cathode 22 of vacuum tube 12. Battery 16 and battery 17 are connected in opposition, and hence their voltages tend to cancel so that the control grid 23 has a proper bias voltage applied thereto. The output circuit of the first stage also includes resistor 14, battery 16 (which constitutes the plate voltage supply) and variable resistor 15, connected in that order between the plate 21 and the cathode 22 of the vacuum tube 12.

The second stage of the amplifier and measuring circuit includes a vacuum tube 18, a cathode-to-grid input circuit, and a plate-to-cathode output circuit. The cathode 27 of vacuum tube 18 is directly connected to the cathode 22 of vacuum tube 12. Hence, the input circuit consists of variable resistor 15, battery 16, resistor 14, and a portion of battery 17, connected in that order between the cathode 27 and the control grid 26 of vacuum tube 18. The portion of battery 17 that is connected in the input circuit is adjustable, so that a proper bias voltage may be placed on grid 26. The output circuits consist of resistor 28, battery 19, battery 16, and variable resistor 15, series connected in that order between the plate 25 and the cathode 27 of vacuum tube 18. Hence, it is clear that variable resistor 15 and battery 16 are connected in series with the output circuits of both stages of the electronic measuring circuit. A microammeter 29 is connected between the plate 25 of vacuum tube 18 and the negative terminal of battery 19 through the rheostat 33, which is used to adjust the current through the circuit to a reference value. The outer electrode 11 of the ionization chamber 9 is connected to the positive terminal of battery 19, thus completing the ionization chamber circuit through resistor 14, a portion of battery 17, and ionization resistor 13. The filaments 30 and 31 of vacuum tubes 12 and 18 are connected in parallel across the filament supply battery 20.

The instrument may be constructed using a type VX32B for vacuum tube 12, and a triode connected type CK502AX for tube 18. Batteries 16 and 19 may be 45 volts, and battery 17 may be 15 volts. Ionization resistor 13 may be of the magnitude of $10^{12}$ ohms, and the effective value of resistors 14, 15, and 28 may be approximately 1.8 megohms, 4,000 ohms and 300,000 ohms, respectively. A meter measuring full scale with a current of 20 microamperes is satisfactory for meter 29.

The filaments 30 and 31 are heated by the current supplied by battery 20. The plate 21 of vacuum tube 12 is placed at a positive potential with respect to the cathode 22 as a result of the electromotive force supplied by battery 16, and hence current may be made to flow between the plate 21 and the cathode 22 in vacuum tube 12. The plate 25 of vacuum tube 18 is placed at a positive potential as a result of the electromotive forces of batteries 16 and 19, which are series connected, and hence current may be made to flow from the plate 25 to the cathode 27 in vacuum tube 18. The outer electrode 11 of the ionization chamber 9 is placed at a positive potential with respect to the inner electrode 10, as a result of the electromotive force supplied primarily by batteries 17 and 19, which are connected in a series aiding relationship. Proper grid biases are selected for grids 23 and 26 by selection of the proper taps on battery 17.

Radiation entering the ionization chamber 9 will result in the formation of positive ions within the chamber which are collected by the negative center electrode 10 of the ionization chamber 9. Hence, a positive charge is placed upon the control grid 23 of vacuum tube 12 resulting in an increase in the plate-to-cathode current through that tube. The increased current in the output circuit of vacuum tube 12 causes an increase in the potential drop across resistors 14 and 15. This increase in the potential drop across resistors 14 and 15 appears as negative feedback in the grid-to-cathode input circuit of vacuum tube 12, so that this increase in potential across resistors 14 and 15 as a result of the ionization can never exceed the percentage $$\frac{\mu}{1+\mu}$$

of the voltage developed by the ion current through resistor 13, where $\mu$ is the amplification factor of the vacuum tube 12. For a VX32B type tube, the ratio of $$\frac{\mu}{1+\mu}$$

is approximately 63 per cent.

Since the cathode 27 of vacuum tube 18 is directly connected to the cathode 22 of vacuum tube 12, the cathode 27 will receive a positive charge as a result of the increased voltage drop across resistors 14 and 15. This in effect drives the grid 26 of vacuum tube 18 negatively with respect to the cathode 27, and causes a decrease in the plate current flowing through vacuum tube 18. The resulting decrease in voltage drop across resistor 28 changes the magnitude of the current flowing through meter 29 which is a measurement of the radiation entering the ionization chamber 9.

The decrease in current through the output circuit of vacuum tube 18 also causes a decrease in the potential drop across variable resistor 15. Since the decrease in current in the output circuit of vacuum tube 18 is much greater than the increase in current in the output circuit of the vacuum tube 12, the net result is that the potential drop across variable resistor 15 is decreased.

In effect, a portion of the output voltage of the two-stage amplifier is fed back to the input of the amplifier through the mechanism of reducing the potential drop across variable resistor 15. This feedback is positive in nature, and thus decreases the negative feedback that is developed across resistor 14. However, the potential drop across resistor 14 must always exceed the potential drop across resistor 15 in order to apply a negative charge to the grid 26 of vacuum tube 18.

It is apparent that the first amplifier stage constitutes a cathode follower, and that the total change in voltage developed across resistors 14 and 15 can never exceed the ratio of $$\frac{\mu}{1+\mu}$$

of the voltage developed across ionization resistor 13. Thus, the voltage developed across resistors 14 and 15 must be always less than the voltage developed across ionization resistor 13, and in the event that vacuum tube 12 is a type VX32B tube, the voltage developed across resistors 14 and 15 will be less than 63 per cent of the voltage developed across ionization resistor 13. It is thus clear, that the voltage drop impressed across resistor 14 may be made to exceed 63 per cent of the voltage developed across resistor 13 as a result of the ion current flowing therethrough, because of the positive feedback applied to the input circuit across variable resistor 15.

By adjusting the positive feedback developed across variable resistor 15, the voltage impressed across resistor 14 may be made equal to the voltage induced across ionization resistor 13. This may be accomplished by adjusting the resistance value of variable resistor 15. Under these conditions, the voltage applied to the ionization chamber 9 has remained substantially constant, since the voltage impressed across ionization resistor 13 has been bucked out by the increase in the potential drop across resistor 14. Thus the ionization chamber 9 does not change in potential, and the instrument is able to give a reading of the ionization occurring in the ionization chamber without the necessity of waiting for the partial discharge of the chamber capacity through the ionization resistor 13 to be accomplished. Hence, the time required by the instrument to respond is exceedingly short, and is not governed by the product of the capacitance of the ionization chamber and its associated circuit, and the resistance of the ionization resistor 13.

The use of negative feedback to reduce the response time of a radiation measuring instrument forms no part of the present invention, that having been disclosed in application Serial No. 172,546 of Barton L. Weller, filed July 7, 1950. However, heretofore the use of negative feedback circuits to reduce the response time of radiation measuring instruments using an ionization chamber has been limited by the fact that the feedback voltage can never completely cancel out the potential developed across the ionization resistor, since the device would then have no signal voltage. This difficulty has been eliminated, as explained above, by the use of positive feedback developed in the input circuit of the amplifier, but exterior to the ionization chamber circuit.

The present invention differs from the device covered by Patent No. 2,465,938, issued to Francis R. Shonka, in that the voltage fed back to reduce the response time of the ionization chamber circuit also appears in the input circuit of the amplifier, while the device of the Shonka patent feeds back a voltage to the ionization chamber circuit which does not appear in the input circuit of the amplifier. Hence, the present invention achieves the advantages derived from the use of negative feedback amplifiers, including greater amplifier stability, and minimizes the disadvantages inherent in such negative feedback amplifiers.

The man skilled in the art will readily devise many equivalent methods and means other than those illustrated in the drawing and described specifically above. The invention accordingly is not limited to the means and methods specifically described and illustrated, but only by the accompanying claims.

What is claimed is:

1. An instrument for the measurement of particles and radiations, said instrument including an ionization chamber circuit provided with a voltage supply, amplifying means having an input circuit connected in series with a portion of said ionization chamber circuit and having an output circuit producing an output voltage varying with the amount of ionization occurring in said ionization chamber, and means to feed back a portion of said output voltage to the ionization chamber circuit, characterized by the improvement wherein the amplifying means includes negative feedback means connecting the output circuit to the input circuit and positive feedback means connecting the output circuit to the input circuit at a point exterior to the ionization chamber circuit.

2. Apparatus for the measurement of particles and radiations comprising, in combination: an ionization chamber circuit including in series a voltage supply, an electrical impedance, and an ionization chamber; a direct current amplifier including at least one vacuum tube, a grid-to-cathode input circuit connected in series with the electrical impedance, and a plate-to-cathode output circuit; negative feedback means connecting the input and output circuits, said means including a second electrical impedance connected in series with the ionization chamber circuit; and positive feedback means connecting the output circuit of the amplifier to the input circuit at a point exterior to the ionization chamber circuit.

3. Apparatus for the measuring of particles and radiations comprising, in combination: an ionization chamber circuit including in series a voltage supply, an electrical impedance, and an ionization chamber; and a two-stage direct current amplifier, the first stage including a vacuum tube, a grid-to-cathode input circuit connected in series with the electrical impedance, and a plate-to-cathode output circuit including a second and a third impedance, the second of said impedances being connected in series aiding relationship with the ionization chamber circuit, and the second stage of the amplifier including a vacuum tube, a grid-to-cathode input circuit connected in series with the second and third impedances, and a plate-to-cathode output circuit connected in series with the third of said impedances, the cathode of said vacuum tube being directly connected to the cathode of the vacuum tube in the first stage.

4. Apparatus for the measurement of particles and radiations comprising, in combination: an ionization chamber circuit including in series a voltage supply, a first electrical impedance, and an ionization chamber; a one-stage direct current amplifier including a vacuum tube, a plate-to-cathode output circuit, a second impedance connected in series with the output circuit, said second impedances being also connected in series aiding relationship with the voltage supply in the ionization chamber circuit, and a grid-to-cathode input circuit including both of said electrical impedances; and means responsive to the output of said amplifier to impress a voltage in series with the grid-to-cathode input circuit aiding the voltage developed across the first impedance, said means being connected exterior to the ionization chamber circuit and bucking the voltage developed across the second of said impedances.

5. Apparatus for the measurement of particles and radiations comprising the apparatus recited in claim 4 wherein the means to impress a voltage in series with the grid-to-cathode input circuit comprises, a third impedance connected in series with the grid-to-cathode input circuit and directly connected to the cathode of the tube, a second direct current amplifier stage including a vacuum tube, a grid-to-cathode input circuit, means to connect said input circuit to the output of the first amplifier, and a plate-to-cathode output circuit connected in series with the third of said impedances.

6. Apparatus for the measurement of particles and radiations comprising, in combination, the apparatus recited in claim 5, and means to measure the change in current through the output circuit of the second of said amplifier's stages.

7. A radiation measuring device including an ionization chamber circuit having an ionization chamber, a voltage source, and a high impedance, and an amplifier having a grid-to-cathode input circuit connected in series with the high impedance, said amplifier being provided with negative feedback to the input circuit, characterized by the improved construction comprising a second impedance connected in series with the input circuit of the amplifier exterior to the ionization chamber circuit, and means to create a positive feedback voltage across said second impedance.

HOWARD V. HERNDON.
RODNEY G. HOFF.

REFERENCES CITED

The following references are of record in the file of this patent:

UNITED STATES PATENTS

| Number | Name | Date |
|---|---|---|
| 2,271,197 | Keall | Jan. 27, 1942 |
| 2,460,907 | Schroeder | Feb. 8, 1949 |
| 2,465,938 | Shonka | Mar. 29, 1949 |

OTHER REFERENCES

MDDC-833, Jan. 17, 1947.
AECD-2051, Wu and Rainwater, May 25, 1945.
AECD-2051, Wu and Rainwater, June 8, 1948.